(No Model.)
M. B. MILLS.
VALVE DEVICE.
No. 439,885. Patented Nov. 4, 1890.
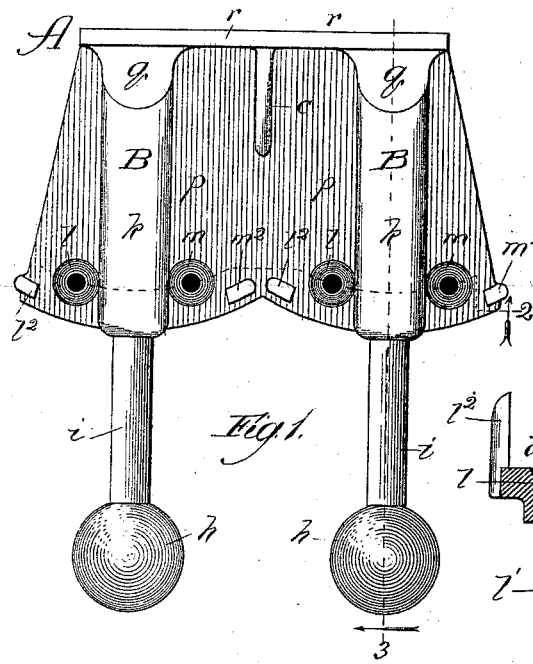
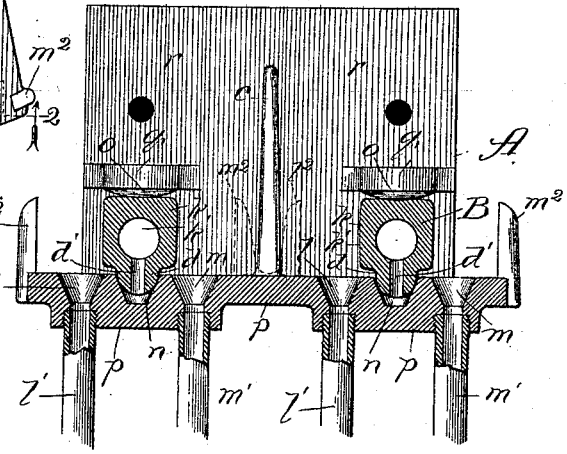
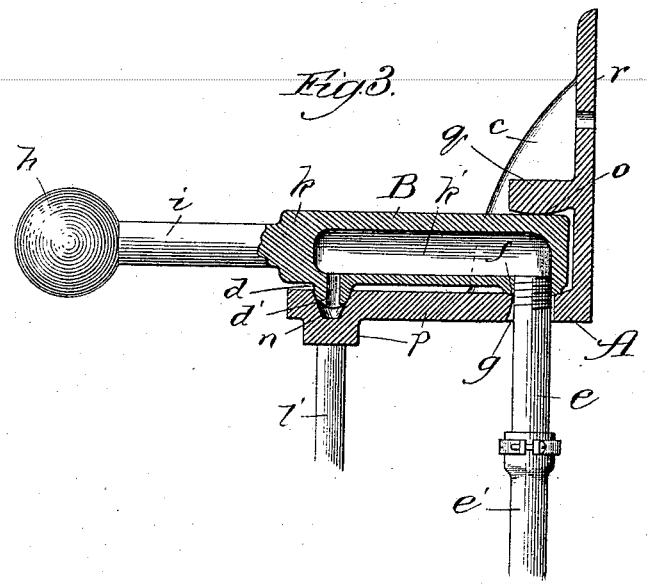
Witnesses:
Inventor:
Mortimer B. Mills.
By Dyrenforth & Dyrenforth,
Attys.

UNITED STATES PATENT OFFICE.

MORTIMER B. MILLS, OF CHICAGO, ILLINOIS.

VALVE DEVICE.

SPECIFICATION forming part of Letters Patent No. 439,885, dated November 4, 1890.

Application filed July 12, 1890. Serial No. 358,493. (No model.)

*To all whom it may concern:*

Be it known that I, MORTIMER B. MILLS, a citizen of the United States, residing at Chicago, in the county of Cook and State of Illinois, have invented a new and useful Improvement in Valve Devices, of which the following is a specification.

The immediate object of my invention is to provide a simple novel construction of valve which shall be readily and reliably operative and effective as a means for controlling the air-pressure in connection with pneumatically-operated railway-crossing gates. It is, however, equally useful and applicable to various other purposes, as for switches and signals operated by fluid-pressure and for controlling fluid-pressure generally, and I desire to be understood as intending to claim it for all the applications to which it may be adapted. The description, hereinafter contained, of the manner of its operation is, however, for the sake of convenience and brevity, limited to its use as a valve device for controlling the air-pressure employed as the medium through which to operate the swinging arms of railway-gates.

In the accompanying drawings, Figure 1 is a plan view of my improved valve device, showing its parts duplicated to provide one valve device for each of two pneumatically-operated railway-crossing gates; Fig. 2, a section taken at the line 2 of Fig. 1 and viewed in the direction of the arrow, and Fig. 3 a section taken at the line 3 of Fig. 1 and viewed in the direction of the arrow.

A is a support, preferably of metal, and in the form of a bracket having the back $r$ and table portion $p$. From near the base of the back $r$ extends a lip $q$, rounded on its under side to form a convex bearing $o$, for a purpose hereinafter described. In the table portion $p$ near its forward edge, and preferably in direct line with the center of the bearing $o$, is a recess $n$, the preferred form of which is that illustrated—namely, of an inverted cone-frustum closed at its base—and the recess $n$ is flanked by similar recesses $m$ and $l$, opening from their bases through the table portion $p$, (thus constituting therein ports,) where they should be threaded, as shown, to receive, respectively, the threaded ends of pipes $m'$ and $l'$. The recesses $m$ and $l$ should, in turn, be flanked by suitable stops $m^2$ and $l^2$.

B is the valve proper, comprising a shell $k$, which should be flat at least along its under side, and is sufficiently long to extend from near the back $r$ of the support A beyond the recesses $m$ $n$ $l$, and the shell $k$ is extended from its forward end into a stem $i$, weighted at its outer extremity, as by means of the knob $h$. Directly below the lip $q$ the table portion $p$ of the support A contains an opening $g$, which should be elongated transversely of the table portion and caused to flare slightly, as indicated in Fig. 3, in a downward and outward direction. The shell $k$ is disposed on the support to bring its rear end underneath the bearing $o$ and to cause its interior passage or chamber $k'$ to communicate from near its rear end through an opening $f$ with the opening $g$ in the table, and a pipe $e$ is inserted through the opening $g$ into the opening $f$, being secured in the latter, as by screwing. Thus the device B may be pivotally supported on the table portion $p$.

Toward the forward end of the shell $k$ it is provided on its under side with a nipple $d$, which should be rounded to fit any of the recesses $m$ $n$ $l$ and form with it a species of ball-and-socket joint, thereby affording a tight passage from a pipe $l'$ or $m'$ into the chamber $k$ through an opening $d'$ in the nipple.

As hereinbefore mentioned, the valve device is shown in the drawings as being provided in duplicate (for two sets of gates, each having one arm or two or more connected arms) with the supports A formed integral as a single support, and the support A may be defined, and the structure should be strengthened by means of the web $c$.

The operation of the device, in connection with a pneumatically-operated railway-crossing gate, is as follows: The support A being secured in position, as through the back $r$, against a wall of the operator's station or cabin, the pipe $e$ for each valve proper B is supposed to lead into the chamber $k'$ through the medium of the hose-connection $e'$ from the air-pressure supply pump or reservoir. (Not shown.) The vertically-swinging gate-arms are supposed to be, as is usually the case, counterbalanced on their supporting-posts, whereby their tendency will be to remain up when raised and down when lowered, the purpose of the air-pressure being alternately to raise and lower them through the medium of piston or analogous mechanism connected with the gate-arms at opposite sides of their fulcrums. Supposing, then, the gate-arms to be raised and requiring to be lowered. The shell $k$ is turned on its pivot by the operator, who raises it for the purpose, grasping it at its knob $h$, and seats the nipple $d$ into an opening, say the port $m$. When the air-pressure is then let on, it passes through the pipes $e'$ $e$, chamber $k'$, passage $d'$, and pipe $m'$ to the piston or analogous mechanism controlling the downward movement of one or more gate-arms, and the latter, in lowering under the force of the air-pressure against the said controlling piston mechanism, obviously operates the piston or analogous mechanism controlling the opposite movement of the gate arm or arms in the contrary direction, which last-named movement is unobstructed by air-pressure, since the latter (if previously introduced through the pipe $l'$ to raise the arms) may escape into space, the passage being open through the pipe $l'$ to the open air. When the lowering of the arm or arms has been accomplished, the operator should raise the device B and turn it to bring its nipple $d$ into the closed recess $n$, which not only closes the compressed-air supply, if it be from a storage-receiver, by the weight $h$, the force of which is greater than that of the air-pressure, but leaves both pipes $l'$ and $m'$ open to the outer air, thereby maintaining only normal air-pressure in them, and thus an equal pressure on each of the pistons or analogous devices for the opposite sides of the gate-arm.

As will readily be understood from the foregoing description, to subsequently raise the gate-arms the operator has but to raise the device B and turn it to insert the nipple $d$ into the port or seat $l$ to direct the air-pressure through the pipe $l'$, and after the raising has been performed the valve B should be again seated in the intermediate closed recess $n$.

In the same way as the device is used for the gate-operating purpose described it may be readily applied or adapted for application to other purposes without thereby departing from my invention.

While the valve proper B is shown and described as being pivotal, it may, obviously, be otherwise movable for operating it.

What I claim as new, and desire to secure by Letters Patent, is—

1. In a valve device, the combination of a support A, having ports $m$ and $l$ and a shell $k$ on the support and having an inlet-opening toward one end of its chamber $k'$ and an outlet-opening toward the opposite end thereof to be brought into coincidence with the ports $m$ and $l$ by moving the shell, substantially as described.

2. In a valve device, the combination of a support A, having ports $m$ and $l$ and an intermediate recess $n$, closed at its base, and a weighted shell $k$ on the support and having an inlet-opening toward one end of its chamber $k'$ and an outlet-opening toward the opposite end thereof to be brought successively into coincidence with the said ports and recess by moving the shell, substantially as described.

3. In a valve device, the combination of a support A, having ports $m$ and $l$ and a shell $k$ on the support and weighted toward its outer end and having an inlet-opening $f$ toward one end of its chamber $k'$ and a rounded perforated nipple $d$, forming the outlet-opening, toward the opposite end thereof, to be brought, by moving the shell, into coincidence and form substantially ball-and-socket joints with the said ports, substantially as described.

4. In a valve device, the combination of a support A, having ports $m$ and $l$ and an intermediate recess $n$, closed at its base, and a shell $k$ on the support and weighted toward its outer end and having an inlet-opening $f$ toward one end of its chamber $k'$ and a rounded perforated nipple $d$, forming the outlet-opening, toward the opposite end thereof, to be brought by turning the shell on its pivot into successive coincidence and form substantially ball-and-socket joints with the said ports and recess, substantially as described.

5. In a valve device, the combination of a support A, having an opening $g$ near one side and ports $l$ and $m$ and an intermediate recess $n$ near its opposite side, pipes $m'$ and $l'$, leading, respectively, into the ports $l$ and $m$, and a shell $k$, pivotally connected near its inner end with the support and provided near such end with an inlet-opening $f$ to its chamber $k'$, a supply-pipe $e$, leading into the said chamber through the openings $g$ and $f$, a weighted stem $i$, extending from the outer end of the shell, and a perforated rounded nipple $d$, forming the outlet from the said chamber, near the outer end of the shell, substantially as described.

6. A valve device comprising, in combination, a support A, having a back $r$, provided with a bearing, and a table portion $p$, provided with an opening $g$ near the back and with ports $l$ and $m$, flanked by stops, and an intermediate recess $n$ near its forward edge, pipes $m'$ and $l'$, connected with the ports, a valve proper B, comprising a shell having a weighted stem $i$ extending from its outer end, and provided near the said outer end with a perforated nipple $d$, forming the outlet from the chamber $k'$, an inlet-opening $f$ to the said chamber near the inner end of the shell, and a supply-pipe $e$, leading into the said inlet-opening through the opening $g$ in the support and pivotally supporting the shell between the table portion $p$ and bearing on the back $r$, the whole being constructed and arranged to operate substantially as described.

MORTIMER B. MILLS.

In presence of—
J. W. DYRENFORTH,
M. J. FROST.